June 5, 1956  F. W. SAMPSON  2,749,399
STEERING WHEEL SWITCH
Filed Sept. 13, 1954
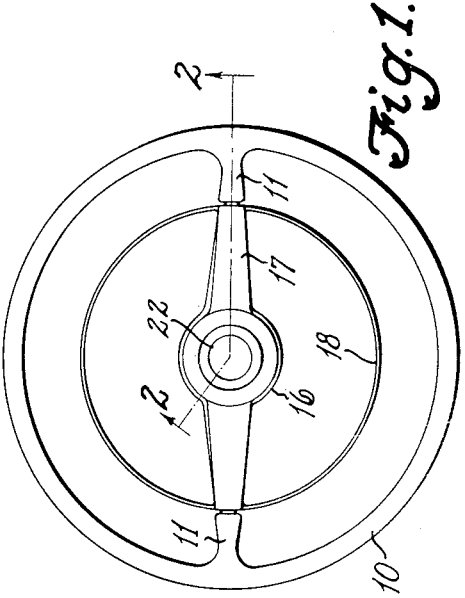
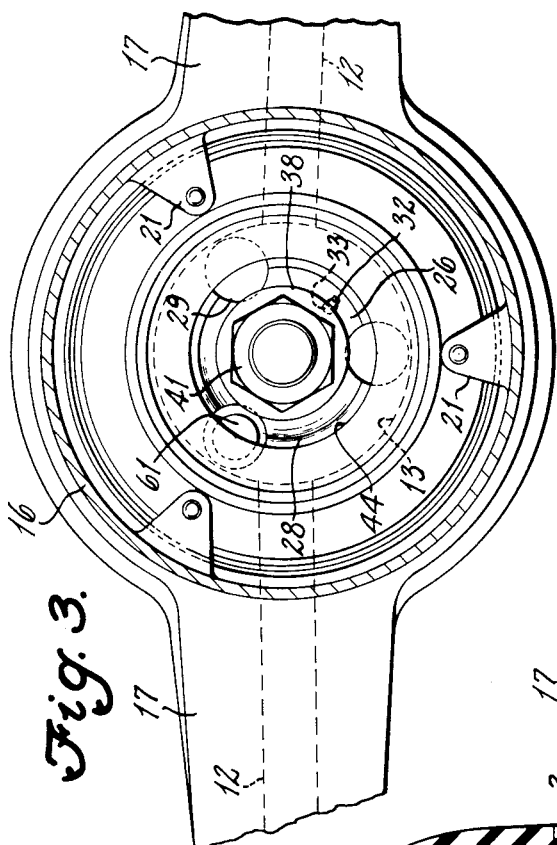
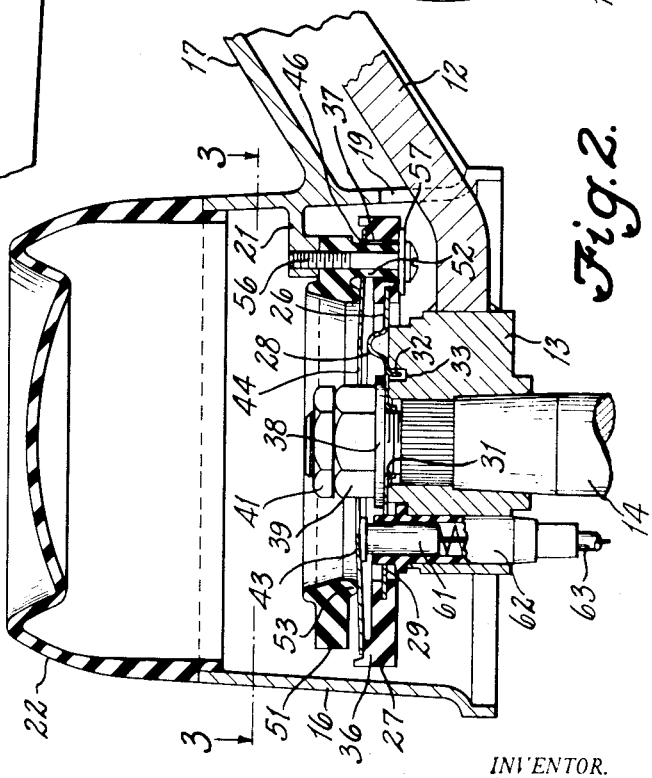
INVENTOR.
FREDERICK W. SAMPSON
BY
his ATTORNEY 2,749,399
Patented June 5, 1956

2,749,399
STEERING WHEEL SWITCH

Frederick W. Sampson, Dayton, Ohio, assignor to General Motors Corporation, Detroit, Mich., a corporation of Delaware Application September 13, 1954, Serial No. 455,526

3 Claims. (Cl. 200—61.56)

This invention relates to switches and particularly to the construction, operation and arrangement of parts of a switch adapted to be mounted on a steering mast of an automobile or the like.

An object of this invention is to provide an improved practical horn blowing switch on the steering column of an automobile which is of simplified construction.

Another object of the invention is to construct a horn blowing switch for use on the steering mast of an automobile or the like from a minimum of parts so as to reduce the manufacturing cost of such a switch.

A further object of the invention is to provide a switch for use on the steering column of a vehicle wherein the moving parts or part of the switch are actuated by an insulating member or members whereby the necessity of separately insulating such member or members is eliminated.

In carrying out the foregoing objects it is a still further and more specific object of this invention to provide a switch having a snap acting spring disc contact mounted between two rigid insulating members one of which when moved relative to the other engages the spring inwardly of a peripheral support therefor and snaps it into engagement with a stationarily mounted contact of the switch to complete an electric circuit to a horn for energizing and sounding same.

Further objects and advantages of the present invention will be apparent from the following description, reference being had to the accompanying drawings wherein a preferred form of the invention is clearly shown.

In the drawings:

Figure 1 is a plan view of a steering wheel and a horn button ring assembly on the upper end of a steering mast of an automobile;

Figure 2 is an enlarged vertical sectional view taken substantially on the line 2—2 of Figure 1 showing the mounting of a steering wheel on a steering shaft and the mounting of a horn button ring and horn switch on a steering column; and Figure 3 is a horizontal sectional view taken on the line 3—3 of Figure 2 showing the position of various elements of the switch assemblage.

Referring to the drawings wherein there is disclosed in Figure 1 thereof a steering wheel 10 having integral spoke portions 11 thereon into which one end of metal spokes 12 (see Figure 2) project and are molded therein. The other end of metal spokes 12 are welded or otherwise suitably secured to a metal hub 13 of wheel 10. Hub 13 of steering wheel 10 is mounted upon the upper end of a steering shaft 14 of a steering mast or column of an automobile for turning the shaft. A combined horn button and horn blowing ring in the form of a die cast metal member or the like is associated with wheel 10 and is also mounted on the steering shaft 14 so as to be turnable therewith and with the steering wheel 10. The member includes a hollow open top cylindrical hub portion 16, hollowed out laterally extending spokes 17 and a horn blowing ring 18 all formed integrally with one another. Hub portion 16 is cut away, as at 19, to permit same to clear the steering wheel spokes 12 when the horn blowing member is placed thereover and mounted on a steering column of an automobile. The hollow or open bottom spokes 17 extending from hub portion 16 are located over and substantially conceal the steering wheel spokes 12. The hub portion 16 of the horn blowing member is provided with a plurality of integral inwardly extending bosses or ears 21 each having a tapped hole therein for a purpose to be hereinafter described. The open top of hub portion 16 is normally closed by a molded plastic or the like cap 22 which may be removably secured thereto in any suitable or conventional manner. A horn switch constructed in accordance with the present invention is located within the hollow hub portion 16 of the horn blowing member. This switch comprises or includes a substantially flat circular or disc-like stationary metal contact 26 which has its peripheral edge embedded in and bonded to a rigid insulating ring member 27 of suitable molded plastic, Bakelite or the like material. Contact 26 is provided with an upwardly bent head-like contact surface 28, a central hole and a plurality of equally spaced apart locating holes 29 (see Figure 3). The metal of contact 26 is flanged downwardly as at 31 (see Figure 2) to provide a collar-like wall for the central hole therein. Stationary contact 26 may, instead of the plurality of locating holes 29, be provided with a single hole 29 and a locating tab 32 struck therefrom and depending into an aperture 33 provided in the hub 13 of wheel 10 for an assembling purpose as will hereinafter be described. Insulating ring member 27 is provided with a raised circular shoulder 36 and a plurality of equally spaced apart holes 37 aligned with the tapped holes in the bosses or ears 21. Contact 26 and its insulating ring member 27 thereon is stationarily secured to the steering shaft 14 by a washer 38, nut 39 and a lock nut 41. A spring steel snap acting disc-like contact 43 having a central hole 44 therein and a plurality of equally spaced apart holes 46 is located above stationary contact 26 and has its peripheral edge portion resting or supported on the shoulder 36 of insulating member 27. Such snap acting disc or contacts are known to those skilled in the art and they may be cut or apertured into many different planular designs as desired. Another or a second rigid insulating ring or member 51 also formed of molded plastic, Bakelite or the like material is disposed between the bosses or ears 21 on hub 16 and the spring contact 43. This insulating ring member 51 is provided with a plurality of equally spaced apart hollow stud-like extensions 52 formed integrally thereon and projecting through the holes 46 in spring contact 43 and into the holes 37 in the first mentioned insulating ring member 27. Insulating member 51 is further provided with an integral continuous circular boss or bead 53 which engages the snap acting contact 43. Member 27 as before stated is stationarily mounted but the members 27 and 51 are relatively movable and the structure for tying the members 27 and 51 together on opposite sides of contact 43 and for moving member 51 downwardly toward member 27 includes screws 56 threaded into the tapped holes provided in bosses or ears 21 and a washer 57 inserted under the head of each screw 56. It will be noted that the shoulder 36 on member 27 is spaced from the flat bottom surface of member 51 and that the head 53 on member 51 engages the contact 43. This space between the shoulder 36 and the flat bottom surface of member 51 together with the slidable or loose fit of the bored or hollow projections 52 on member 51 in the holes 37 of member 27 is utilized to render the members 27 and 51 relatively movable as will hereinafter be described. A brush or terminal 61 slidably located in an insulating retainer 62 mounted on and secured to hub 13 of wheel 10 is biased into engagement with the spring contact 43 at all times by a small coil spring located thereunder. The insulating retainer 62 extends upwardly above hub 13 and projects through one of the holes 29 in contact 26 so as to insure that terminal 61 will be insulated from contact 26. Brush or terminal 61 has a wire connection 63 with a source of electric current and with a horn on or in the automobile. Stationary contact 26 is grounded to the steering shaft 14 and parts associated therewith and when the spring contact 43 is brought into engagement with the grounded stationary contact 26 an electric circuit to the horn is completed for energizing and sounding same.

The contacts 26 and 43 together with the insulating ring members 27 and 51 are movably secured together as a unit within the hollow hub portion 16 of the horn blowing ring member. In order to assemble this unit upon the steering column and to the steering shaft 14, after the wheel hub 13 carrying the terminal 61 has been slipped over the upper end of shaft 14, the flange 31 about the central hole in contact 26 is aligned with the threaded end of shaft 14 and is lowered thereover. The cap 22 is removed from the hub portion 16 of the horn blowing unit or assemblage during this assembling operation. While lowering this unit and particularly contact 26 over shaft 14 one of the locating holes 29 is brought into registration with insulating retainer 62 of terminal 61 or the tab 32 is brought into registration with the aperture 33 in wheel hub 13 according to which one of the locating means is employed in the structure. The entire horn blowing unit is further lowered upon the steering column to bring contact 26 into engagement with the top surface of wheel hub 13. The washer 38 and the nuts 39 and 41 are then secured to the end of shaft 14 to lock the unit thereto. The tab 32 on contact 26 is adapted to engage the wall of aperture 33 to prevent rotation of contact 26 relative to hub 13 while the nut 39 is being tightened in place to thus avoid any sheering force being applied to the insulator 62 of terminal 61. Regardless of the position of rest that the spring contact 43 may be in during this assembling operation the slidable fit between members 27 and 51 permits the spring pressed terminal 61 upon engaging this spring contact to move the members 27 and 51 apart and to snap contact 43 into its normal upward bowed position for engaging the bead 53 of insulating member 51 as shown in Figure 2 of the drawings. Cap 22 is then placed on the unit to close the open top of hub portion 16 of the horn blowing unit.

A downward force applied to the ring 18 at any one point about the circumference thereof or to its spokes 17 or to cap 22 will tilt the horn blowing unit relative to steering wheel 10, steering shaft 14 and/or stationary contact 26 and will move certain of the bosses or ears 21 and consequently insulating member 51 downwardly. This downward movement of a boss 21 and member 51 shifts a screw 56 and the hollow stud-like projection 52 on member 51 downwardly within a hole 37 of ring member 27 on stationary contact 26. The downward movement of these parts of the unit causes the bead surface 53 on member 51 to depress a portion of the spring 43 whereupon this spring contact 43 snaps into a downward bowed position against the bead-like contact surface 28 of stationary contact 26. In this manner the electric circuit is completed from the source of supply thereof to the horn for energizing and causing the same to sound. As soon as the force is relieved from ring 18 the spring tension stored up in the spring contact causes the same to snap back into its normal retained position as shown in Figure 2 of the drawings thus readying the horn switch actuating unit for another horn blowing operation.

It should be apparent that an improved horn switch and horn sounding combination has been provided and that the combination is of simple construction and low manufacturing cost. The improved unit utilizes members normally required in switches and serving only to insulate electric contacts or conductors from one another for other purposes or functions to thereby reduce the number of parts in a switch to substantially essential elements. A snap acting spring contact as employed in the present combination lends itself to the construction of a more simplified and less expensive switch of prolonged life. The improved switch is actuatable to cause the horn to sound regardless of the position of the steering wheel relative to the steering column and irrespective of the point force is applied to the actuating unit.

While the form of the embodiment of the invention as herein disclosed constitutes a preferred form, it is to be understood that other forms might be adopted as may come within the scope of the claims which follow.

What is claimed is as follows:

1. In combination, a steering column of an automobile, a steering wheel having a hub mounted on the steering shaft of said column, a movable horn blowing ring having an integral hollow hub portion on said steering column, a switch actuated by said ring, a terminal carried by the hub of said steering wheel and associated with said switch, said terminal having an electrical connection with a horn, said switch comprising a stationary contact mounted upon said steering wheel hub and a snap acting spring contact associated with said stationary contact and engaging said terminal, means for mounting said spring contact within the hollow hub portion of said ring, said means including a rigid insulating member stationarily secured to the peripheral edge of said stationary contact and provided with a raised peripheral shoulder, said means also including another rigid insulating member stationarily secured to the integral hollow hub portion of said ring, said spring contact being disposed between said insulating members and having its peripheral edge supported on the raised shoulder of said stationary insulating member, said another insulating member being movable relative to said stationary insulating member to engage said spring contact inwardly of its supported peripheral edge to cause same to snap into engagement with said stationary contact and complete an electric circuit to the horn, and said another insulating member being moved in response to a force applied to said ring.

2. A switch for the steering column of an automobile having the hub of a steering wheel mounted on a steering shaft thereof comprising, a disc-like contact stationarily secured to the steering shaft above the steering wheel hub, said contact having its peripheral edge embedded in a first rigid shouldered insulating member, said first member being provided with a plurality of apertures spaced apart therearound, a spring contact above said stationary contact with its peripheral edge resting upon the shoulder on said first member, a second rigid insulating member above said spring contact and provided with integral hollow stud portions extending through the apertures in said first rigid member, fastening means engaging said first member and extending through the hollow stud portions of said second member and secured to the hub portion of a movable horn blowing means, an electrical terminal carried by the steering wheel hub and extending through an opening provided in said stationary contact, said terminal having a connection with a source of electric current and with a horn, said terminal engaging said spring contact and being insulated from said stationary contact and said wheel hub, and said second rigid insulating member being so shaped as to apply a force to said spring contact inwardly of the shoulder on said first member to snap same into engagement with said stationary contact when said horn blowing means is depressed for completing an electric circuit to the horn.

3. In combination, a steering column of an automobile, a steering wheel having a hub mounted on the steering shaft of said column, a horn blowing ring movable relative to said wheel and having an integral hollow hub portion on said steering column, a switch actuated by said ring, a terminal carried by the hub portion of said steering wheel and associated with said switch, said terminal being insulated from said steering wheel hub and having an electrical connection with a horn, said switch comprising a stationary contact insulated from said terminal and mounted upon said steering wheel hub and a snap acting spring contact associated with said stationary contact and engaging said terminal, means for mounting said spring contact within the hollow hub portion of said ring, said means including a first rigid insulating member secured to the outer edge of said stationary contact and provided with a raised peripheral shoulder, said means also including a second rigid insulating member secured to the integral hollow hub portion of said ring, said spring contact being disposed between said insulating members and having its peripheral edge supported on the raised shoulder of said first insulating member, said stationary contact having a raised bead-like contacting surface extending therearound in circular fashion intermediate said steering shaft and the shoulder on said first insulating member, and said second insulating member being movable in response to a force applied to said ring relative to said first insulating member to engage said spring contact inwardly of its supported edge and cause same to snap into engagement with said bead-like contacting surface on the stationary contact for completing an electric circuit to the horn.

References Cited in the file of this patent

UNITED STATES PATENTS 2,237,055  Little _____ Apr. 1, 1941
2,555,510  Sampson _____ June 5, 1951